United States Patent [19]

Wüthrich et al.

[11] Patent Number: 4,740,701

[45] Date of Patent: Apr. 26, 1988

[54] INFRARED INTRUSION DETECTOR

[75] Inventors: Alfred Wüthrich, Stäfa; Walter Meier, Orselina, both of Switzerland

[73] Assignee: Cerberus AG, Männedorf, Switzerland

[21] Appl. No.: 864,321

[22] Filed: May 19, 1986

[30] Foreign Application Priority Data

May 24, 1985 [CH] Switzerland ....................... 02220/85

[51] Int. Cl.4 ........................... G01J 5/08; G02B 3/02

[52] U.S. Cl. .................................... 250/342; 250/353; 350/433; 350/452

[58] Field of Search ................ 250/353, 341; 350/433, 350/452

[56] References Cited

U.S. PATENT DOCUMENTS

| | | | |
|---|---|---|---|
| 3,703,718 | 11/1972 | Berman | 340/567 |
| 4,058,726 | 11/1977 | Paschedag et al. | 250/353 |
| 4,318,089 | 3/1982 | Frankel et al. | 340/567 |
| 4,321,594 | 3/1982 | Galvin et al. | 340/567 |
| 4,339,748 | 7/1982 | Guscott et al. | 340/555 |
| 4,375,034 | 2/1983 | Guscott | 250/342 |
| 4,385,808 | 5/1983 | Vanderwerf | 350/452 |
| 4,523,095 | 6/1985 | Keller-Steinbach | 250/349 |
| 4,545,366 | 10/1985 | O'Neill | 126/440 |

FOREIGN PATENT DOCUMENTS

| | | | |
|---|---|---|---|
| 3235250 | 3/1984 | Fed. Rep. of Germany | 350/452 |
| 2122339 | 1/1984 | United Kingdom | 250/353 |

*Primary Examiner*—Janice A. Howell
*Assistant Examiner*—Constantine Hannaher
*Attorney, Agent, or Firm*—Werner W. Kleeman

[57] ABSTRACT

An intrusion detector evaluates the infrared radiation emitted by an intruder within a closely defined zone or area by means of a virtual protective curtain. Uniform sensitivity independent of incident angle of the radiation is provided by a cylindrical Fresnel lens of small thickness, which divides the field of reception into sharply defined strips or elongate zones of substantially uniform sensitivity. The longitudinal axis of this Fresnel lens defines an arcuate sector of a circle whose radius is determined by the focal length in perpendicular direction, and an infrared sensor is arranged at the circular center point, i.e., the focal point of the curved Fresnel lens. One particularly advantageous embodiment of the intrusion detector includes a double sensor configuration, equipped with several sensor elements cooperating with one or more cylindrical Fresnel lenses, thus covering a number of separate zones for simultaneous radiation detection.

12 Claims, 2 Drawing Sheets

INFRARED INTRUSION DETECTOR

BACKGROUND OF THE INVENTION

The present invention broadly relates to a new and improved construction of an apparatus for detecting and evaluating infrared radiation.

In its more specific aspects the present invention relates to a new and improved construction of an infrared intrusion detector, comprising at least one aspherical optical arrangement for bundling the infrared radiation from at least one strip-shaped region or zone of incident radiation directed onto a sensor, and further including an evaluating circuit connected to the sensor for generating an output signal as a function of a predetermined amount of radiation change at the sensor.

In other words, the infrared intrusion detector of the present invention is of the type comprising an infrared sensor for sensing infrared radiation, at least one strip-shaped reception zone for receiving the infrared radiation, at least one aspherical optical arrangement for focusing the infrared radiation on the infrared sensor, and an evaluation circuit connected to the infrared sensor for emitting a signal in response to a predetermined alteration in the irradiation of the infrared sensor by the infrared radiation.

Such intrusion detectors are known, for instance, from U.S. Pat. No. 4,058,726, granted Nov. 15, 1977, or German Patent No. 2,645,040, granted Oct. 9, 1981. FIG. 4 of each of these patents depicts an intrusion detection apparatus. Strip-shaped sectorial zones of the field of reception are formed by cylindrical lenses, one lens per sector, arranged in front of a detector. This method is quite suitable for keeping a room under surveillance by providing a number of vertically oriented, parallel, flat field sectors or zones, which will reliably trigger an alarm upon their being crossed by an intruder.

Such known arrangements however, are limited in effectiveness when employed in applications requiring a single sector or zone, or sectors or zones not in close proximity with each other, yet having accurately defined border lines, such as required for protective curtains in front of openings, such as doors or windows, or as "flat gates" in front of protected objects. First of all, the vertical incidence angle is limited by the housing, and virtually never approaches the nearly 90° required for a fully effective protective curtain. Furthermore, only the center portion of the cylindrical lens can provide proper focusing, since only in this particular location does the sensor lie within the focal area. For eccentrically incident radiation, the sensor lies outside the focal area, resulting in a defocused or blurred image. As a result, offset or eccentric incident radiation produces diffused border lines and, under extreme conditions, adjacent areas are likely to stray into the neighboring reception zone, so that efficient protection becomes impossible.

A further disadvantage lies in the increasing length of the optical path with increasing off-center or eccentric orientation of the incident angle inherent in cylindrical lenses. Since the far infrared absorption of the material of the lens is no longer negligible for instance in the 10$\mu$ range (peak body radiation of humans), radiation attenuation becomes more pronounced with increasing off-center or eccentric orientation of the incident radiation. Such an intrusion detector therefore loses sensitivity with increasing scope of the incident angle, and thus further limits the usefulness of such an arrangement for a protective curtain type application.

The intrusion detector described in U.S. Pat. No. 4,375,034, granted Feb. 22, 1983 for one or more receiving regions or zones, shows an arrangement with improved borderline definition and increased aperture or reception angle. It includes a spherical reflector, comprising a special arrangement of one or more cylindrical reflectors. This requires a complicated optical arrangement, with precise adjustment of reflectors with respect to each other, and this precise adjustment must be maintained throughout the lifetime of the apparatus (i.e., many years). Furthermore, reflector surfaces tend to age, and become soiled in time, causing a progressive loss of reflectivity together with increased scattering, so that the sensitivity, efficiency and operational reliability of this type detector steadily decrease.

SUMMARY OF THE INVENTION

Therefore, with the foregoing in mind, it is a primary object of the present invention to provide a new and improved construction of an intrusion detecting apparatus which does not exhibit the aforementioned drawbacks and shortcomings of prior art constructions.

A further significant object of the present invention is to provide a new and improved construction of an infrared intrusion detecting apparatus for forming a protective curtain, comprising at least one strip-shaped reception zone of wide incident angle with closely defined zonal border lines, and substantially uniform radiation sensitivity across the entire aperture or field of protection defined by the Fresnel lens.

Yet another noteworthy object of the invention is to provide a new and improved construction of an apparatus for intrusion detection, as described hereinbefore, which apparatus comprises a minimum of optical elements, in an efficient, reliable arrangement, so as to assure long term operational sensitivity, efficiency, and reliability.

Now in order to implement these and still further objects of the invention, which will become more readily apparent as the description proceeds, the intrusion detecting apparatus of the present invention is manifested by the features that the optical arrangement comprises at least one substantially cylindrical Fresnel lens, which in its longitudinal axis or direction defines an arc sector whose radius is determined by its focal length, and wherein the sensor is arranged at least in close proximity to the circle center point, i.e., the focal point of the cylindrical Fresnel lens.

In other words, the infrared intrusion detector of the present invention is manifested by the features that the at least one aspherical optical arrangement comprises at least one substantially cylindrical Fresnel lens having a longitudinal axis, a focal point and a focal length and the lens being curved about or along an axis perpendicular to the longitudinal axis to form a sector of a circle having a center point. The sector of the circle has a radius corresponding to the focal length and the infrared sensor is arranged at least approximately in the center point and in the focal point.

In accordance with the aforementioned characteristics it is possible to improve the performance of the apparatus with respect to the quality of the optical image, thus providing improved borderline definitions of the reception area or zone, as well as the radiation absorption, while rendering the sensitivity of the detector independent of the incident angle of radiation, thus making such a detector particularly suitable for generating a flat field-type protective curtain with a wide incident or aperture angle. Furthermore, only a single, easily mountable optical element is needed.

It is of particular advantage to construct the infrared sensor element as a dual sensor element, which can be incorporated in a differential circuit arrangement. A double curtain arrangement with two receiving areas can thus be constructed, by means of a circular Fresnel lens, providing particularly interference-resistant and selective detection of trespassing or intrusion attempts.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
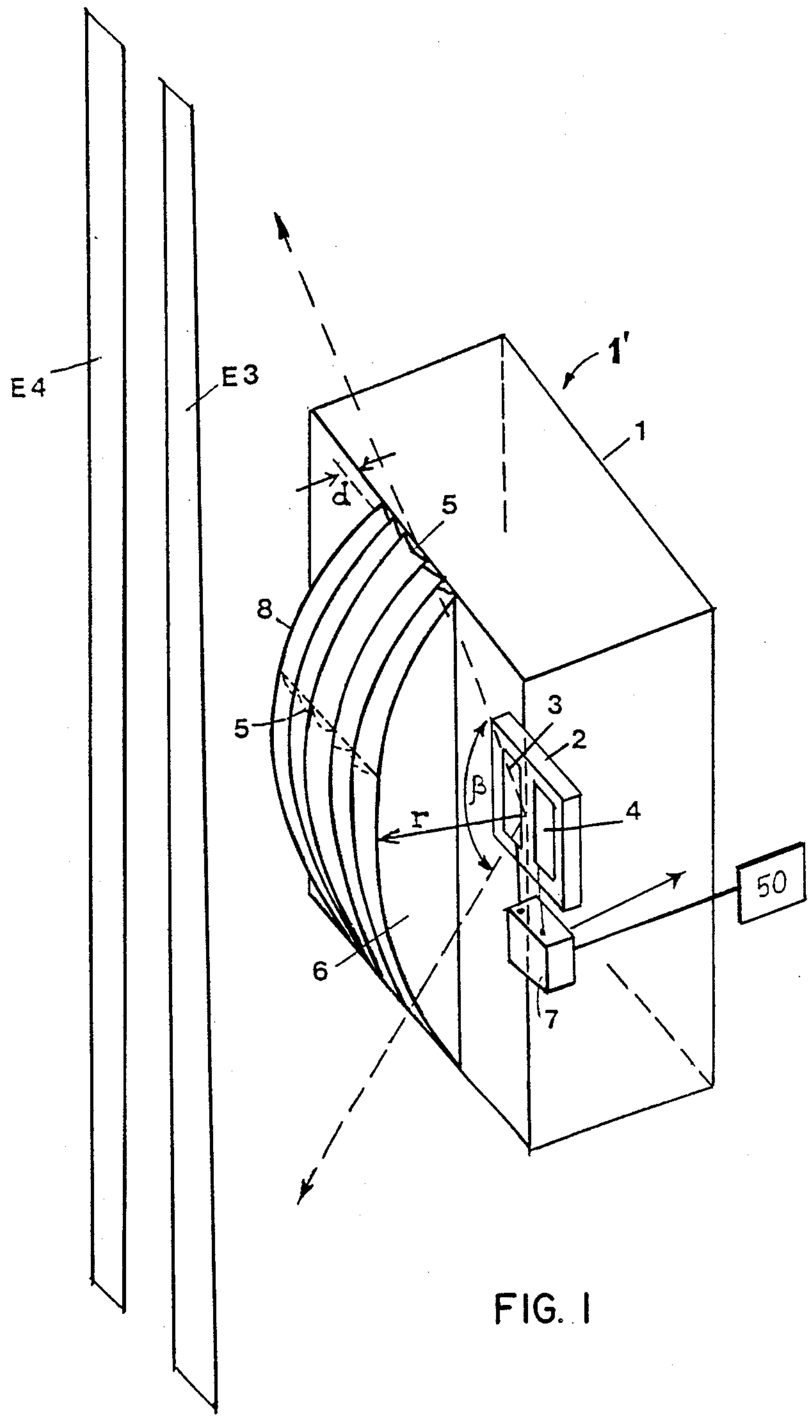
FIG. 1 shows a first intrusion detection apparatus in a perspective view.

Describing now the drawings, it is to be understood, that to simplify the showing thereof, only enough of the structure of the infrared intrusion detection apparatus has been illustrated herein, as is needed to enable one skilled in the art to readily understand the underlying principles and concepts of the present invention. Turning now specifically to FIG. 1 of the drawings, the infrared intrusion detector apparatus illustrated therein by way of example and not limitation will be seen to comprise an infrared intrusion detecting apparatus designated in its entirety with the reference numeral 1', comprising a housing 1, in which is arranged an infrared sensor 2, of which the peak sensitivity preferably lies within the radiation spectrum of the human body. e.g., within the range of 5 . . . 15 μm and preferably in the neighborhood of 10 μm. The sensor 2 therefore may be constructed as a pyroelectric detector. The sensor 2 may be constructed as a single sensor possessing only one zone for radiation reception, whenever only one single reception area or zone is required for forming a single protective curtain, or it may be constructed in the form depicted in FIG. 1, as a double sensor construction, with two adjacent sensor elements 3 and 4, which are responsive to two adjacent detecting or receiving zones or areas E3 and E4 functioning as protective curtains. The sensor elements 3 and 4 may each have an orientation extending in the longitudinal direction of the detector or detecting apparatus 1'.

For this purpose the front side of the housing 1 comprises an optical arrangement comprising a substantially cylindrical Fresnel lens 8. In a practical embodiment the cylindrical Fresnel lens 8 has, in transverse orientation, a predetermined focal length defining a transverse axis with respect to its structure, and comprises numerous characteristic grooves 5. The optical thickness of the Fresnel lens 8 across its entire width is limited to a predetermined maximum value, and the transverse axis is preferably horizontally oriented. Normally, no focusing takes place in the longitudinal direction, which in practice is usually vertically oriented. That is, focusing of the cylindrical Fresnel lens 8 has in effect the characteristic of a cylindrical lens, focusable only in the transverse direction, but without any further focusing or refractive properties for rays. By constructing the cylindrical Fresnel lens 8 as a cylindrical Fresnel lens with uniform, limited thickness, lengthwise as well as transversely, its flexibility and stability surpasses by far properties commonly achieved with massive lens structures. This makes feasible a practical construction in which the cylindrical Fresnel lens, in the form of a sector of an arc, can be arranged at the front section of the housing 1, with the center portion or mid-region of the cylindrical Fresnel lens 8 protruding from the housing front side or wall. The open sides of the Fresnel lens 8 can be obturated by shields 6, as depicted in this practical example. The radius r of the curvature of the Fresnel lens 8 is chosen to correspond as closely as possible to the transverse focal length, so that the sensor 2 is located closely to the center of the circle, thus within the focal point, so that the distance of the sensor 2 from the lens 8 remains independent of the incident angle of reception, remaining at a focal distance equal to the focal length in transverse direction. In order to obtain an optimal effect, the arc of the cylindrical Fresnel lens 8 should have a lengthwise radius r of curvature corresponding as closely as possible to the value of the transverse focal length, and the sensor should be located as closely as possible to the center or focal point.

The outstanding features of this invention permit the construction of an apparatus for producing a uniform, high quality optical image, valid for the full range of the usable incident angles, across the entire vertical input or reception aperture. Thus, the reception zones or areas achieved therewith are uniformly and precisely defined over the entire reception or lens aperture, and permit establishing a protective curtain with equal sensitivity over the entire reception or lens aperture. In addition to the aforementioned features, the optical path, as well as the radiation absorption of the lens are not influenced by the incident angle, so that no reduction of sensitivity is caused by increasing the width of this incident angle. Further more the curvature of the Fresnel lens permits the construction of a housing with lower depth, and also permits placing the sensor closer to the front end of the housing, thus allowing a usable incident angle of up to 90°. These advantages can even be obtained with a single, robust, and easily mountable optical element.

The detector arrangement described can be implemented with one single sensor for forming only one, single receiving zone or area, i.e., one single, protective or evaluated curtain. The sensor output signal can be processed in accordance with conventional state-of-the-art methods, e.g. as described in the U.S. Pat. No. 3,703,718, granted Nov. 21, 1972. When using a dual sensor arrangement comprising two separate sensor elements for establishing a double curtain configuration and forming two adjoining reception areas or zones in close proximity to each other, it can be advantageous to connect the sensors to a differential circuit 7 which in turn is connected to a known, particularly selectively functioning evaluation or processing circuit indicated in FIG. 1 by reference character 50, e.g. constructed according to the U.S. Pat. No. 4,339,748, granted July 13, 1982 to which reference may be readily had.

Figure 2:
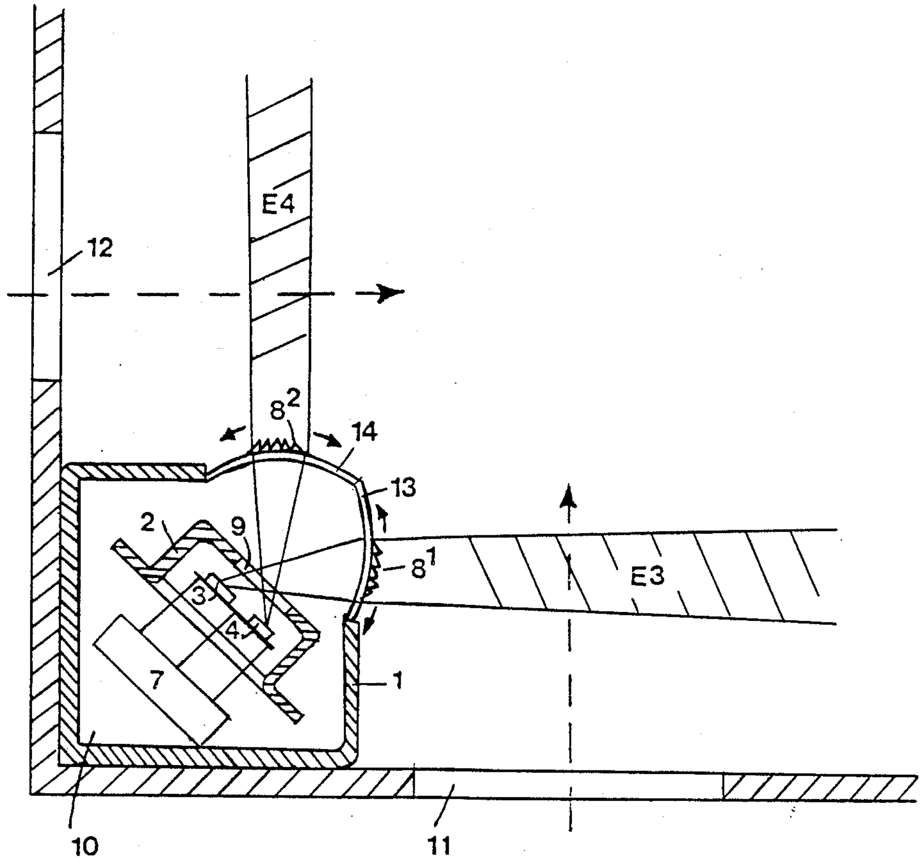
FIG. 2 shows a second intrusion detection apparatus in a horizontal cross-section, and a possible positioning concept.

If desired, it is also feasible to incorporate several Fresnel lenses within the same housing, in order to be able to simultaneously monitor a number of reception areas or zones. FIG. 2 shows an embodiment of such a detector 10, which is arranged in a corner location of a room to be monitored for attempted intrusion, and which embodiment permits the simultaneous use of two reception areas or zones E3 and E4, to simultaneously monitor for intrusion two walls 11 and 12 of this room comprising doors and windows. For this purpose, the two reception areas or zones must form a horizontal angle of approximately 90° with respect to each other. This is achieved by incorporating within the housing 1 an infrared sensor arrangement 2, comprising a first sensor element 30 and a second sensor element 4 (dual sensor) connected to a differential circuit 7, in accordance with the example first described with reference to FIG. 1. In place of a single Fresnel lens, this embodiment comprises two substantially cylindrical Fresnel lenses, a first Fresnel lens $8^1$ and a second Fresnel lens $8^2$, which are arranged one each at adjacent sides of the housing 1. Both cylindrical Fresnel lenses $8^1$ and $8^2$ again are bent to a circular curvature with a corresponding radius, as required by their focal length, whereas both focal lengths may be chosen equal, or may differ, to best match special practical requirements, e.g. highly rectangular, i.e. long and narrow, rooms. The arrangement of these two lenses $8^1$ and $8^2$ is such that a first sensor element 3 lies within the focal point of the first cylindrical Fresnel lens $8^1$ and a second sensor element 4 lies within the focal point of the second cylindrical Fresnel lens $8^2$. The first sensor element 3 thus picks up radiation from the reception area or zone E3, while the second sensor element 4 picks up radiation from the reception area or zone E4. To protect the sensor elements 3 and 4 from undesirable radiation, originating from outside the receiving zones or areas, such as from non-associated reception zones or from irrelevant substantially cylindrical Fresnel lenses, an aperture or radiation entry window 9 is arranged in front of the sensor elements 3 and 4. By this method it is possible to monitor simultaneously, with one detector, two wall surfaces or zones forming an angle of approximately 90° with respect to each other. A certain amount of flexibility and adjustability of the angle between both reception areas or zones can be achieved by arranging the first and second cylindrical Fresnel lenses $8^1$ and $8^2$ on arc-shaped sections 13 and 14 which are pivotably arranged at the sides of the walls of the housing 1, whereas the sensor elements 3 and 4 are located within the center point of the arc formed therewith. The sensor 2 or the sensor elements 3 and 4 may be arranged to pivot along arcuate segments of the substantially cylindrical Fresnel lens 8 or lenses $8^1$ and $8^2$.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. An infrared intrusion detector, comprising:

an infrared sensor for sensing infrared radiation;

at least one aspherical optical arrangement for focusing said infrared radiation on said infrared sensor and defining at least one substantially strip-shaped reception zone for receiving said infrared radiation;

said at least one aspherical optical arrangement comprising at least one substantially cylindrical Fresnel lens having a longitudinal axis, a focal point and a focal length;

said at least one substantially cylindrical Fresnel lens being curved along an axis perpendicular to said longitudinal axis to form a sector of a circle having a center point;

said sector of said circle having a radius substantially corresponding to said focal length; and said infrared sensor being arranged at least approximately at said center point and in said focal point.

2. The infrared intrusion detector as defined in claim 1, further including:

a housing having at least one wall;

said at least one substantially cylindrical Fresnel lens having a mid-region; and said at least one substantially cylindrical Fresnel lens being mounted to said at least one wall with at least said mid-region protruding from said at least one wall.

3. The infrared intrusion detector as defined in claim 2, wherein:

said at least one substantially cylindrical Fresnel lens comprises a first substantially cylindrical Fresnel lens and a second substantially cylindrical Fresnel lens said housing having at least one further wall different from said at least one wall; and said first substantially cylindrical Fresnel lens being provided on said at least one wall and said second substantially cylindrical Fresnel lens being provided on said at least one further wall.

4. The infrared intrusion detector as defined in claim 1, wherein:

said infrared sensor comprises two sensor elements;

said two sensor elements defining a first sensor element and a second sensor element;

said first sensor element having a first orientation and said second sensor element having a second orientation;

said longitudinal axis having a third orientation; and said first, second and third orientations being essentially identical.

5. The infrared intrusion detector as defined in claim 4, further including:

an evaluation circuit connected to said infrared sensor for emitting a signal in response to a predetermined alteration in irradiation of said infrared sensor by said infrared radiation;

said evaluation circuit being provided with a differential circuit; and said first sensor element and said second sensor element being mutually connected within said differential circuit.

6. The infrared intrusion detector as defined in claim 4, wherein:

said at least one substantially cylindrical Fresnel lens comprises a plurality of substantially cylindrical Fresnel lenses having a plurality of longitudinal axes each having essentially the same orientation.

7. The infrared intrusion detector as defined in claim 1, wherein:

said at least one substantially cylindrical Fresnel lens comprises individual substantially cylindrical Fresnel lenses;

each substantially cylindrical Fresnel lens of said individual substantially cylindrical Fresnel lenses having a focal point;

said infrared sensor comprising different sensor elements;

a respective one of said different sensor elements being arranged at each of said focal points;

each said substantially cylindrical Fresnel lens being operatively associated with a predetermined one of said different sensor elements;

each said individual substantially cylindrical Fresnel lens and said therewith associated predetermined one of said different sensor elements being responsive to a first predetermined number of different reception zones;

said individual substantially cylindrical Fresnel lenses corresponding in number to a second predetermined number; and said first predetermined number corresponding to said second predetermined number.

8. The infrared intrusion detector as defined in claim 7, further including:

a radiation entry window arranged in front of said first sensor element and said second sensor element for shielding said first and second sensor elements from radiation of non-associated reception zones.

9. The infrared intrusion detector as defined in claim 7, further including:

a radiation entry window arranged in front of said first sensor element and said second sensor element for shielding said first and second sensor elements from radiation of irrelevant substantially cylindrical Fresnel lenses.

10. The infrared intrusion detector as defined in claim 9, wherein:

said individual substantially cylindrical Fresnel lenses, said first sensor element and said second sensor element are arranged such that they conjointly define associated reception zones; and said associated reception zones mutually including a horizontal angle in the range of 90°.

11. An infrared intrusion detector, comprising:

an infrared sensor for sensing infrared radiation;

at least one aspherical optical arrangement for focusing said infrared radiation on said infrared sensor and defining at least one substantially strip-shaped reception zone for receiving said infrared radiation;

said at least one aspherical optical arrangement comprising at least one substantially cylindrical Fresnel lens having a longitudinal axis, a focal point and a focal length;

said at least one substantially cylindrical Fresnel lens being curved along an axis perpendicular to said longitudinal axis to form a sector of a circle having a center point;

said sector of said circle having a radius substantially corresponding to said focal length;

said infrared sensor being arranged at least approximately at said center point and in said focal point;

a housing having at least one wall and at least one further wall different from said at least one wall;

said at least one substantially cylindrical Fresnel lens comprises a first substantially cylindrical Fresnel lens and a second substantially cylindrical Fresnel lens;

each said first substantially cylindrical Fresnel lens and said second substantially cylindrical Fresnel lens having a respective mid-region;

said first substantially cylindrical Fresnel lens being mounted to said at least one wall with at least said mid-region thereof protruding from said at least one wall;

said second substantially cylindrical Fresnel lens being mounted to said at least one further wall with at least said mid-region thereof protruding from said at least one further wall;

said first substantially cylindrical Fresnel lens being provided on said at least one wall and said second substantially cylindrical Fresnel lens being provided on said at least one further wall;

said infrared sensor comprises a first sensor element defining a first circular arc having said center point which defined a first center point and a second sensor element defining a second circular arc having a second center point;

said first sensor element being situated at said first center point and said second sensor element being situated at said second center point; and said first substantially cylindrical Fresnel lens being pivotable along said first circular arc and said second substantially cylindrical Fresnel lens being pivotable along said second circular arc.

12. An infrared intrusion detector, comprising:

an infrared sensor for sensing infrared radiation;

at least one aspherical optical arrangement for focusing said infrared radiation on said infrared sensor and defining at least one substantially strip-shaped reception zone of wide incident angle with closely defined zonal border lines and substantially uniform radiation sensitivity across a predeterminate aperture defined by said at least one aspherical optical arrangement for receiving said infrared radiation;

said at least one asphercial optical arrangement comprising at least one substantially cylindrical Fresnel lens having a longitudinal axis, a focal point and a focal length;

said at least one substantially cyindrical Fresnel lens being curved along an axis perpendicular to said longitudinal axis to form a sector of a circle having a center point;

said sector of said circle having a radius substantially corresponding to said focal length; and said infrared sensor being arranged at least approximately at said center point and in said focal point.

* * * * *